United States Patent
Puglisi et al.

(10) Patent No.: US 10,306,034 B1
(45) Date of Patent: May 28, 2019

(54) MOBILE DEVICE POCKET WITH REUSABLE STICKY BACK AND OPTIONAL CHARGING CORD HOLDER

(71) Applicants: Marc Puglisi, Wayne, NJ (US); David A. Laemle, Westwood, NJ (US)

(72) Inventors: Marc Puglisi, Wayne, NJ (US); David A. Laemle, Westwood, NJ (US)

( * ) Notice: Subject to any disclaimer, the term of this patent is extended or adjusted under 35 U.S.C. 154(b) by 0 days.

(21) Appl. No.: 16/123,301

(22) Filed: Sep. 6, 2018

(51) Int. Cl.
*H04M 1/04* (2006.01)
*H04B 1/3888* (2015.01)
*F16L 3/13* (2006.01)

(52) U.S. Cl.
CPC ............ *H04M 1/04* (2013.01); *H04B 1/3888* (2013.01); *F16L 3/13* (2013.01)

(58) Field of Classification Search
CPC ............ H04M 1/04; H04M 19/08; H04B 3/54
USPC ............ 455/573, 575.1, 575.6; 379/324, 454
See application file for complete search history.

(56) References Cited

U.S. PATENT DOCUMENTS

| 4,101,184 A * | 7/1978 | Barrett | A47B 5/006 248/447 |
| 2015/0230042 A1* | 8/2015 | McGuire | H04W 4/80 455/418 |
| 2017/0055686 A1* | 3/2017 | Lavin | A45F 5/00 |

* cited by examiner

*Primary Examiner* — Sam Bhattacharya
(74) *Attorney, Agent, or Firm* — Kaliko & Associates, LLC; Scott H. Kaliko, Esq.

(57) ABSTRACT

A system and method for fabricating a mobile device holder may include the mobile device holder being fabricated from a base plate overlaid with an elastic and a non-elastic or semi-elastic material. The mobile device holder may include a base plate, a front panel, a middle panel and a back panel. The base plate may be temporarily or permanently attached to the back panel with an adhesive. The middle plate may be temporarily attached to the base plate with an adhesive. The front panel comprised from an elastic material and a non-elastic or semi-elastic material that forms a pocket to hold the mobile device. The base plate, the front panel, the middle panel and the back panel are attached to each other by an attachment means. A reusable sticky adhesive is attached to the back panel to allow the mobile devise holder to be attached to any surface multiple times. A cord holder may be attached to the pocket, where the cord holder is comprised of a hard or flexible material to grip the cord when in use and release the cord when not in use.

7 Claims, 6 Drawing Sheets

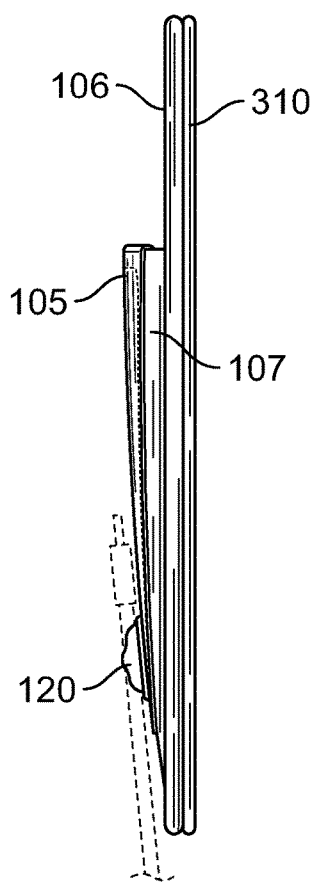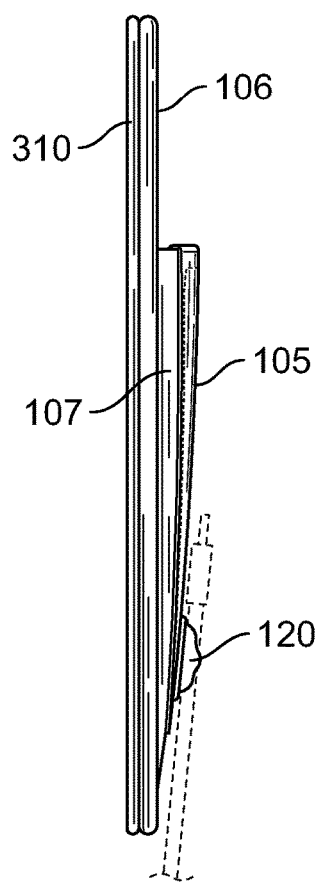
FIG. 4  FIG. 5
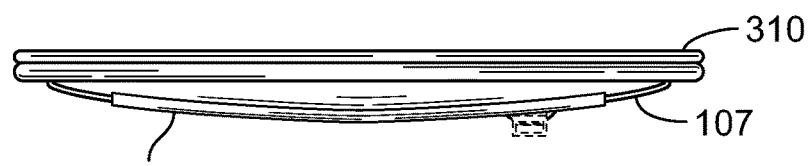
FIG. 6
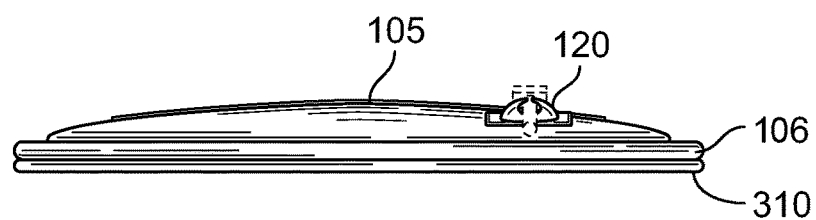
FIG. 7

MOBILE DEVICE POCKET WITH REUSABLE STICKY BACK AND OPTIONAL CHARGING CORD HOLDER

BACKGROUND

The present invention relates to mobile device holders, and the like in particular a mobile device pocket with a reusable back that may be applied and reapplied to various surfaces a plurality of times, and which is capable of expanding in width and depth to adjust to different size mobile devices.

Some types of mobile device holders are cradles or stands or holders that allow the mobile device to be held and charged on a desk or other type of stand. Others are holders with fixed depths or widths. However, none of these mobile device cradles or stands allow the mobile device to be held of the vertical face of desk or other surface with a reusable sticky back with an optional charging cord holder. Moreover, none of the prior mobile device cradles or phone stands accommodate various sized mobile devices using elastic materials.

It is therefore and object of the present invention to provide a mobile device holder with a reusable sticky back.

It is another object of the present invention to provide a mobile device holder with an optional cord holder.

A further object of the present invention is to allow for the holding and charging of various sized mobile devices.

Still another object of the present invention is for the holder to accommodate various sized charging cords for charging various type of mobile devices.

SUMMARY OF THE INVENTION

These and other objects are obtained with the mobile device pocket with reusable sticky back and optional charging cord holder. The mobile device pocket with reusable sticky back and optional charging cord holder may be fabricated from a base plate overlaid with elastic and one of a non-elastic and semi-elastic material. The semi-elastic material may be, for example, a latex-spandex material. This material contains LYCRA together with nylon and cotton. A material having this description is available, for example, from E.I. du Pont de Nemours & Company. The non-elastic material may be, for example, a polyurethane or a plush micro fiber material and may be fabricated into various shapes and sizes.

The mobile device holder of the present invention may include a base plate, a front panel, a middle panel and a pocket panel. The front panel may be comprised from the elastic material and a non-elastic or semi-elastic material that forms a pocket to hold the mobile device. The base plate, the front panel, the middle panel and the pocket panel may fixably attached to each other, and a reusable sticky adhesive is attached to the back panel to allow the mobile devise holder to be attached to any surface multiple times.

Another embodiment of the mobile device holder of the present invention may include a mobile device holder being fabricated from a base plate overlaid with an elastic and a non-elastic or semi-elastic material. The mobile device holder may include a base plate, a front panel, a middle panel and a pocket panel. The base plate is temporarily attached to the middle panel with an adhesive. The front panel comprised from an elastic material and a non-elastic or semi-elastic material that forms a pocket to hold the mobile device. The base plate, the front panel, the middle panel and the pocket panel fixably attached to each other by an attachment means. The attachment means may be gluing, sewing, riveting, stapling or any combination thereof. A reusable sticky adhesive is attached to the back panel to allow the mobile devise holder to be attached to any surface multiple times. A cord holder attached to the pocket, where the cord holder is comprised of a flexible material to grip the cord when in use and release the cord when not in use.

A method for fabricating a mobile device holder with a reusable sticky back comprising may include the steps of: 1) selecting a plurality of suitable materials for fabricating a mobile device holder; 2) die cutting the suitable materials selected, wherein the suitable materials are die cut into various shapes and sizes; 3) arranging materials in desired order; 4) folding over overlapping materials; 5) attaching overlapped materials together with an adhesive; 6) stitching overlapped materials together; 7) attaching a reusable adhesive membrane; and 8) optionally attaching a cord holder to the pocket.

DETAILED DESCRIPTION OF THE DRAWINGS

FIG. 4 is a side view of a version of the present invention.

FIG. 5 is a side view of a version of the present invention.

FIG. 6 is a top view of a version of the present invention.

FIG. 7 is a bottom view of a version of the present invention.

Figure 8:
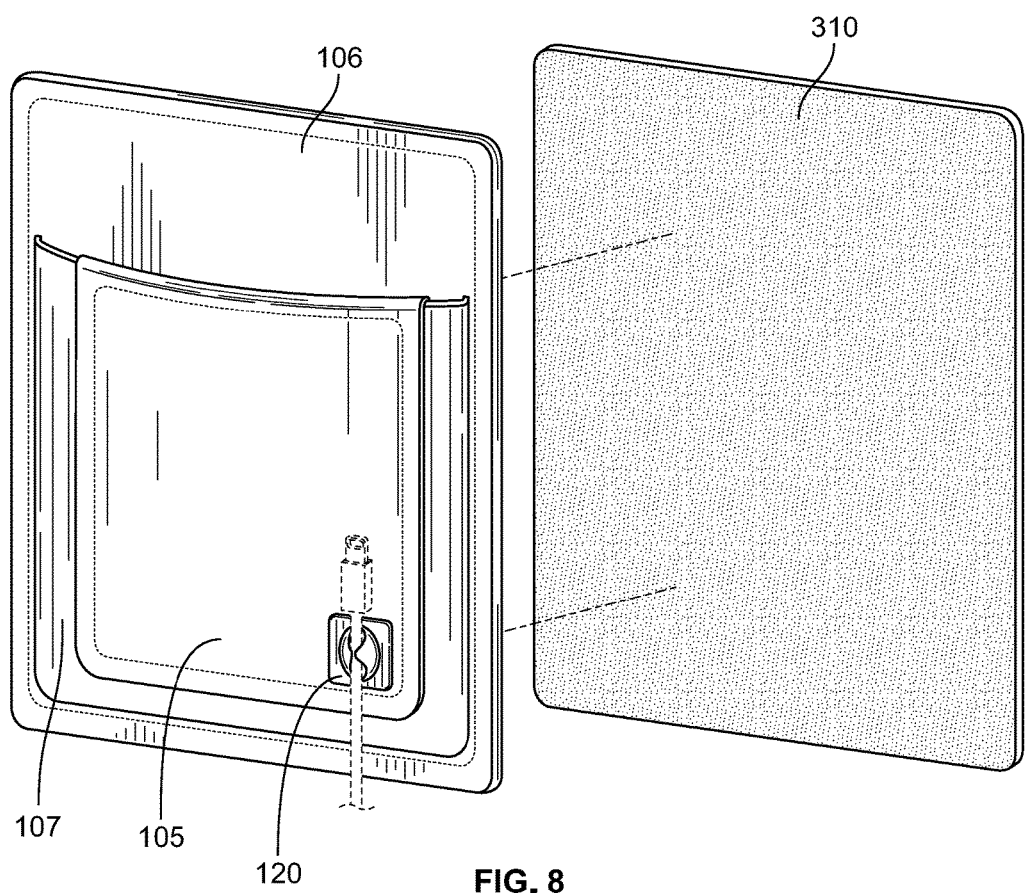

FIG. 8 a front view of a partially exploded view of the present invention.

Figure 9:
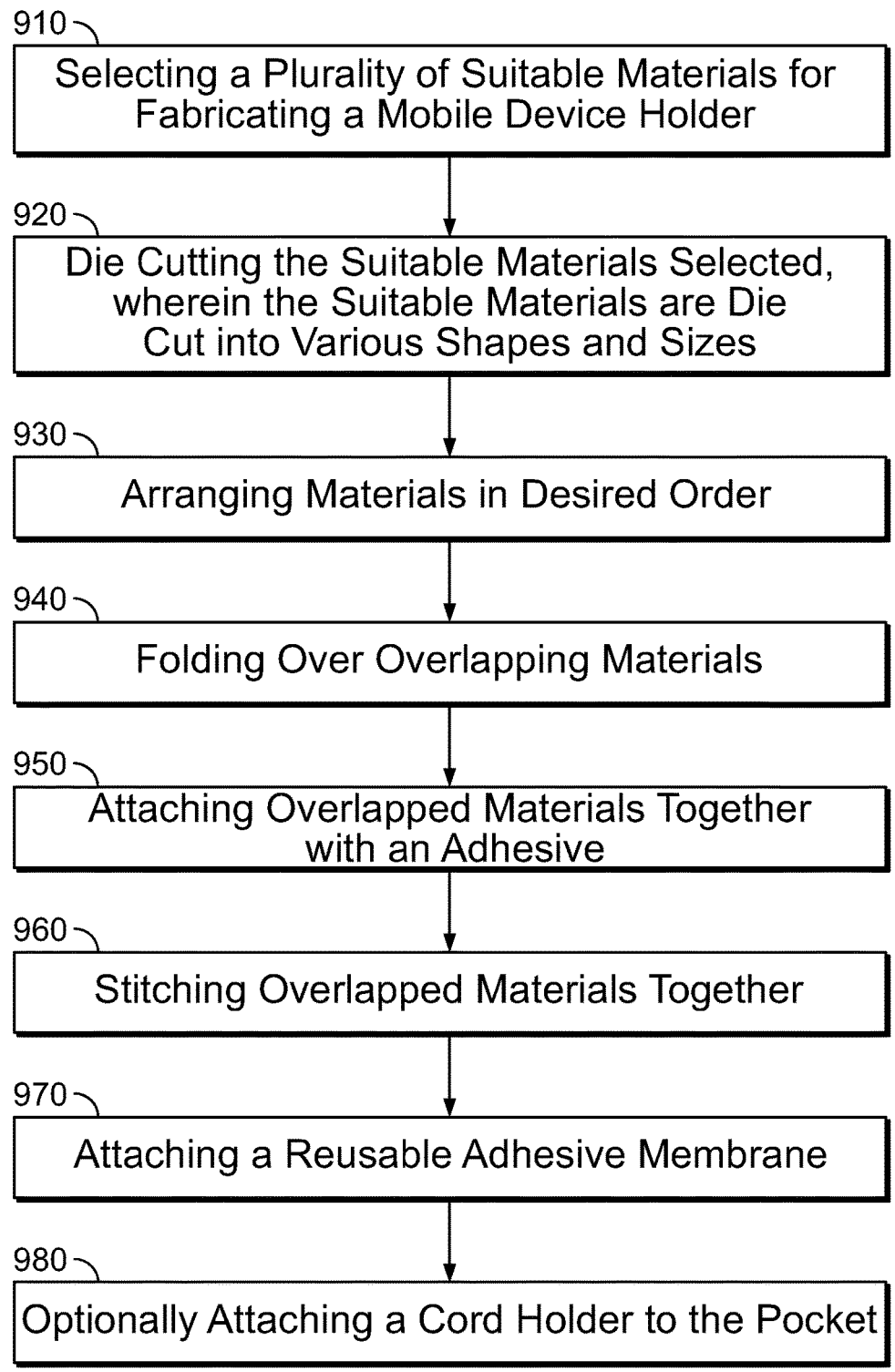

FIG. 9 is a chart describing the steps of making the present invention.

Figure 10:
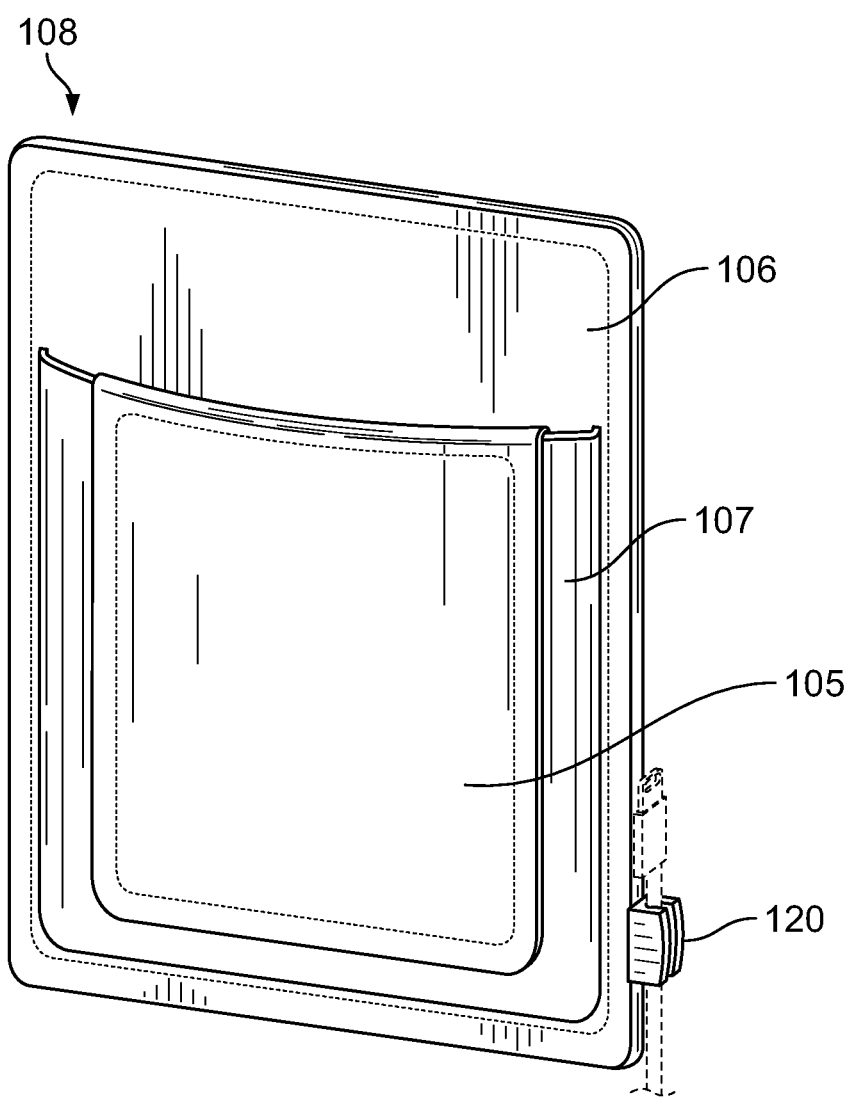

FIG. 10. Is a front view of a version of the present invention with the optional cord holder attached to the side of the present invention.

DETAILED DESCRIPTION

Hereinafter, the present invention is further introduced in detail by the particular embodiments in combination with the figures.

Figure 1:
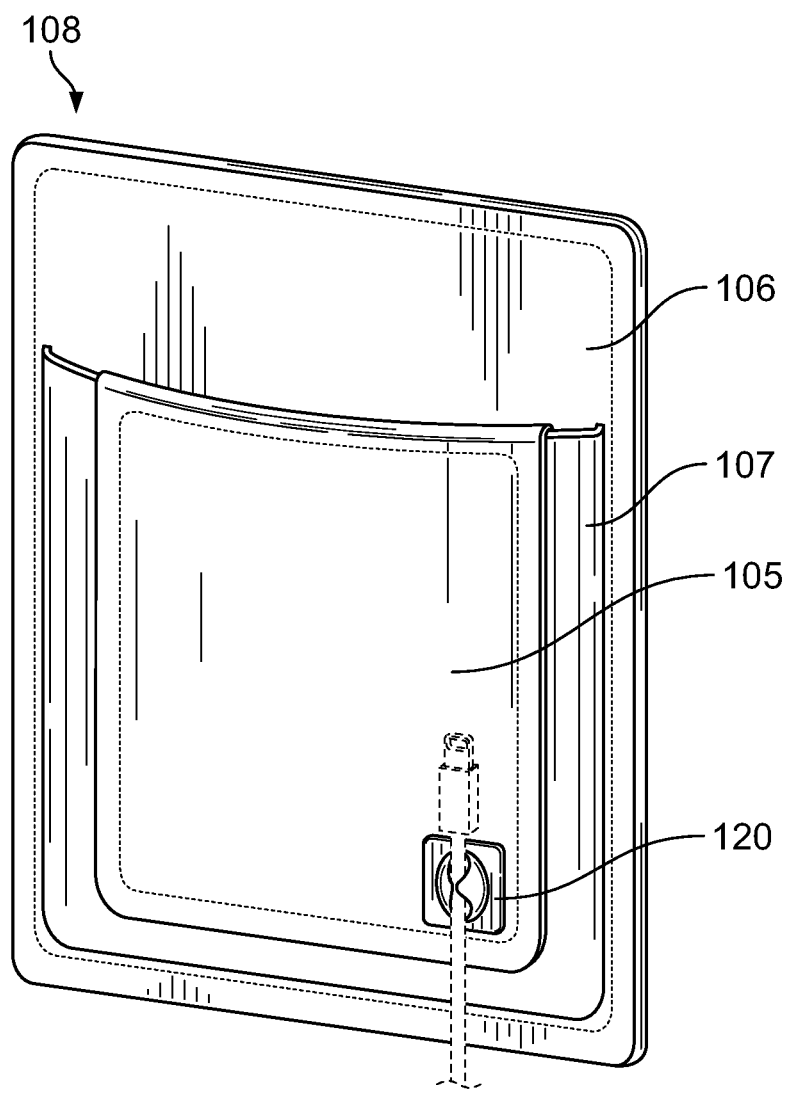
FIG. 1 is a perspective view of a version of the Mobile Device Pocket with Reusable Sticky Back and Optional Charging Cord Holder.

FIG. 1 shows a front perspective diagram of the present invention with optional cord holder 120 attached to the front of pocket 108, comprising: base plate 101 (not shown), front panel 105, middle panel 106, pocket panel 107, and charging cord holder 120.

Base plate 101 may, for example, be any rigid, semi-rigid, or combination thereof material to allow the present invention to have some rigidity to it. For example, base plate 101 may include materials such as corrugated board, plastic, or any other lightweight and semi-rigid materials desired. FIG. 1 also shows front panel 105 and middle panel 106. Front panel 105 and middle panel 106 may be constructed from non-elastic or semi-elastic material that overlays Base Plate 101. Non-elastic or semi-elastic material may include a polyurethane (PU) material, which is a type of versatile plastic. The three types of PU materials are flexible foams, rigid foams and elasto-plastics. Non-elastic or semi-elastic material may further include micro fiber material or plush microfiber material. The Use of all of the afore-mentioned materials are contemplated for use in the present invention.

FIG. 1 also includes pocket panel 107 and may optionally also include a charging cord holder 120. Pocket panel 107 may be any stretchable elastic fabric material to accommodate and stretch to the size of various mobile devices and hold them securely. For example, pocket panel 107 may be comprised from a LYCRA or spandex like material. As shown in FIGS. 1 and 10, charging cord holder 120 may be used to hold a charging cord to the mobile device for ease in locating charging cord 120. Charging cord holder may be made from any suitable lightweight rubber to expand and/or contract as needed to accommodate cords of different widths or diameters and allows the holder to hold the cord in place using friction. Cord holder 120 may be located anywhere on the front of the pocket (FIG. 1) or the side of the pocket (FIG. 10).

Figure 2:
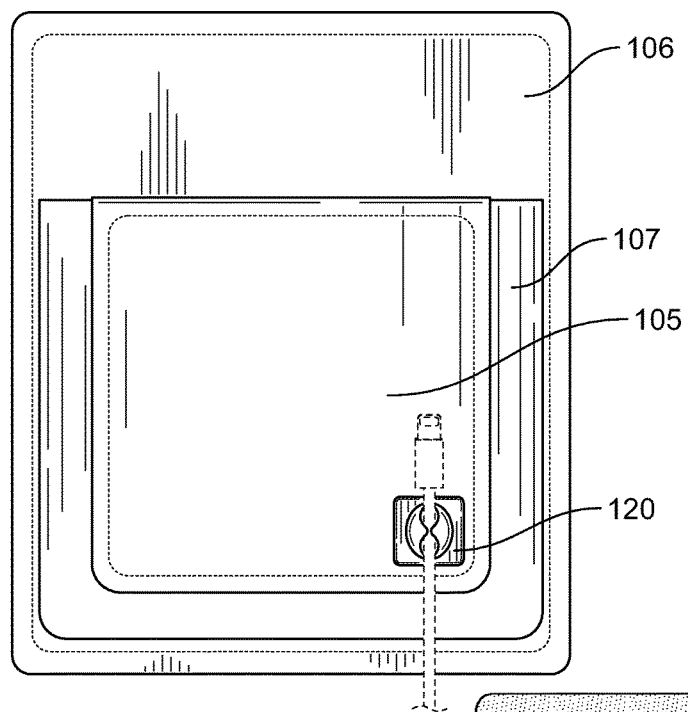
FIG. 2 is a front view of a version of the present invention.

FIG. 2 shows a front diagram of the present invention with optional cord holder attached to the pocket, comprising: a base plate 101 (not shown), a front panel 105, a middle panel 106, a pocket panel 107, and a charging cord holder 120. The structures in FIG. 2 are the same as FIG. 1.

Figure 3:
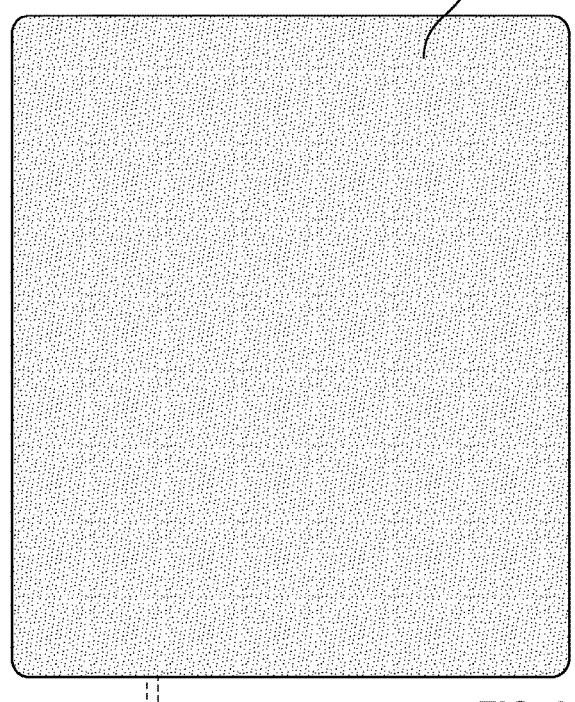
FIG. 3 is a back view of a version of the present invention.

FIG. 3, shows the back view of the present invention and includes sticky back 310. Sticky back 310 may, for example, be a polymer-based adhesive or other type of adhesive to sufficiently hold the present invention to any surface while holding the mobile device. Examples of a polymer-based adhesives include: SCOTCH Double Sided Tape, 3M Double Sided Adhesive Tape, Double Sided Adhesive Gel Pads, SIZZIX Multipurpose Adhesive Sheets, and the like.

FIGS. 4,5,6,7 show a left, a right side, a top and a bottom diagram of the present invention with optional cord holder attached to the pocket, comprising: a base plate 101 (not shown), a front panel 105, a middle panel 106, a pocket panel 107, and a charging cord holder 120. The structures recited in FIGS. 4,5,6,7 are the same as FIGS. 1 and 3.

FIG. 8 shows a partially exploded perspective front view of the present invention. FIG. 8 includes shows a front diagram of the present invention with optional cord holder attached to the pocket, comprising: a base plate 101 (not shown), a front panel 105, a middle panel 106, a pocket panel 107, a charging cord holder 120, and sticky back 310.

For example, base plate 101 may include materials such as corrugated board, plastic, or any other lightweight and semi-rigid material desired. FIG. 8 also shows front panel 105 and middle panel 106. Front panel 105 and middle panel 106 may be constructed from non-elastic or semi-elastic material that overlays Base Plate 101. Non-elastic or semi-elastic material may include a polyurethane (PU) material), which is a type of versatile plastic. The three types of PU materials are flexible foams, rigid foams and elasto-plastics. Non-elastic or semi-elastic material may further include micro fiber material or plush microfiber material. The Use of all of the afore-mentioned materials are contemplated for use in the present invention.

FIG. 8 also includes pocket panel 107 and charging cord holder 120. Pocket panel 107 may be any stretchable elastic fabric material to accommodate and stretch to the size of various mobile devices and hold them securely. For example, pocket panel 107 may be comprised from a LYCRA or spandex like material. Charging cord holder 120 may be used to hold the charging cord to the mobile device for ease in locating and string the charging cord. Charging cord holder may be made from any suitable lightweight rubber to expand and/or contract as needed to hold the cord using friction. Further, FIG. 8 may also include Sticky back 310 may, for example, be a polymer-based adhesive or other type of adhesive to sufficiently hold the present invention to any surface while holding the mobile device and may be adhesively connected to the present invention.

FIG. 9 show a flow-process diagram illustrating a method for creating a mobile device pocket with reusable sticky back and optional charging cord holder, comprising the steps of: Step 910 selecting a plurality of suitable materials for fabricating a mobile device holder; Step 920 die cutting the suitable materials selected, wherein the suitable materials are die cut into various shapes and sizes; Step 930 arranging materials in desired order; Step 940 folding over overlapping materials; Step 950 attaching overlapped materials together with an adhesive; Step 960 stitching overlapped materials together; Step 970 attaching a reusable adhesive membrane; and Step 980 optionally attaching a cord holder to the pocket.

FIG. 10. Shows the optional cord holder 120 placement on the side of the present invention.

While the present invention has been disclosed in connection with versions shown in detail, various modifications and improvements thereon will become readily apparent to those skilled in the art. Accordingly, the spirit and scope of the present invention is to be only limited by the following claims.

What is claimed is:

1. A method for fabricating a mobile device holder with a reusable sticky back comprising the steps of:
   (a) selecting a plurality of suitable materials for fabricating a mobile device holder;
   (b) die cutting the suitable materials selected, wherein the suitable materials are die cut into various shapes and sizes;
   (c) arranging suitable die cut materials in desired order;
   (d) folding over any overlapping excess die cut materials;
   (e) attaching any overlapping folded excess die cut materials together with an adhesive;
   (f) stitching any overlapping folded excess die cut materials together;
   (g) attaching a reusable adhesive membrane to the back of the mobile device holder; and
   (h) optionally attaching a cord holder to the mobile device holder.

2. The method of claim 1, wherein suitable materials comprise a plurality of elastic, non-elastic, and semi-elastic materials.

3. The method of claim 1, wherein the elastic material is comprised of a stretchable elastic material.

4. The method of claim 1, wherein the non-elastic and the semi-elastic material is comprised from at least one of polyurethane material and a plush micro fiber material.

5. The method of claim 1, wherein the attaching overlapped materials together with an adhesive includes at least one of gluing, sewing, riveting, and stapling.

6. The method of claim 1, wherein the attaching a reusable adhesive membrane is fixably attached to the back panel to allow the mobile device holder to be attached to any surface multiple times.

7. The method of claim 1, wherein the optionally attaching a cord holder to the mobile device holder where the cord holder is comprised of a flexible material to grip a cord when in use and release the cord when not in use.

* * * * *